(12) United States Patent
Mitzschke et al.

(10) Patent No.: US 7,896,766 B2
(45) Date of Patent: Mar. 1, 2011

(54) SIDE BOW CONVEYOR CHAIN WITH INNER AND OUTER CHAIN LINKS

(75) Inventors: Frank Mitzschke, Holztilren (DE); Wolfgang Janzen, Wilnsdorf (DE); Jens Sumpf, Stollberg (DE); Sven Eichhorn, Muehlental (DE); Klaus Nendel, Oederan (DE)

(73) Assignee: iwis antriebssysteme GmbH & Co. KG, Munich (DE)

( * ) Notice: Subject to any disclaimer, the term of this patent is extended or adjusted under 35 U.S.C. 154(b) by 451 days.

(21) Appl. No.: 12/054,932

(22) Filed: Mar. 25, 2008

(65) Prior Publication Data

US 2008/0242462 A1  Oct. 2, 2008

(30) Foreign Application Priority Data

Mar. 29, 2007  (DE) ...................... 10 2007 015 276

(51) Int. Cl.
*F16G 13/02* (2006.01)
(52) U.S. Cl. ..................... 474/206; 198/850; 198/851; 198/852; 198/853
(58) Field of Classification Search ................. 474/206; 198/831, 850–853
See application file for complete search history.

(56) References Cited

U.S. PATENT DOCUMENTS

| 3,905,304 | A | * | 9/1975 | Ord ........................... 104/172.5 |
| 3,952,860 | A | * | 4/1976 | Specht ........................ 198/701 |
| 4,267,691 | A | * | 5/1981 | Schoenick ...................... 59/85 |
| 4,422,544 | A |  | 12/1983 | Alldredge |
| 4,895,248 | A | * | 1/1990 | Wahren ....................... 198/852 |
| 5,402,880 | A | * | 4/1995 | Murphy ....................... 198/852 |
| 5,489,020 | A | * | 2/1996 | Clopton ....................... 198/851 |
| 5,803,236 | A | * | 9/1998 | Wahren ....................... 198/852 |
| 6,779,652 | B2 | * | 8/2004 | Baier et al. .................. 198/831 |

FOREIGN PATENT DOCUMENTS

| DE | 102 07 678 A1 | 9/2003 |
| DE | 101 51 863 A1 | 5/2005 |
| GB | 2 123 518 A | 7/1982 |

* cited by examiner

*Primary Examiner*—Sang Kim
(74) *Attorney, Agent, or Firm*—Leydig, Voit & Mayer, Ltd.

(57) ABSTRACT

The present invention relates to a side bow conveyor chain whose respective chain links are interconnected by a chain hinge which is adapted to be pivoted about a first and a second axis, said chain hinge comprising a pivot bolt which is arranged along said first axis, a pivot pin which is arranged along said second axis and through which the pivot bolt extends, and a reception sleeve, which extends along the second axis and in which the pivot pin is pivotable relative to the reception sleeve about said second axis. The reception sleeve is provided with lateral pivot openings which allow the pivot bolt to pass through. The stability of such a chain is improved by the features that inner and outer chain links are provided in alternating succession, that an inner chain link comprises a reception sleeve on either end thereof and at least one inner link plate interconnecting said reception sleeves, that an outer chain link comprises a pivot bolt and a pivot pin on either end thereof and at least two outer link plates interconnecting the same, and that each of the end faces of the at least two outer link plates laterally encompasses a reception sleeve of a neighbouring inner chain link. The inner and outer link plates, which are arranged such that they are set up on edge, extend vertically to the first axis when the chain moves straight ahead.

21 Claims, 17 Drawing Sheets

SIDE BOW CONVEYOR CHAIN WITH INNER AND OUTER CHAIN LINKS

The present invention relates to a side bow conveyor chain whose respective chain links are interconnected by a chain hinge which is adapted to be pivoted about a first and a second axis, said chain hinge comprising a pivot bolt which is arranged along said first axis, a pivot pin which is arranged along said second axis and through which the pivot bolt extends, and a reception sleeve, which extends along the second axis and in which the pivot pin is arranged such that it is pivotable relative to the reception sleeve about said second axis, said reception sleeve being provided with lateral pivot openings which allow the pivot bolt to pass through.

A chain of this type is known from e.g. from DE 10151863 as well as from DE 10207687. The first and the second axis of these chains extend at right angles to each other so that a kind of universal joint connection exists between the chain links. The individual chain links have connected thereto a respective support plate so that all the chain links and support plates form together a plate belt. Guide faces on the chain links guarantee, in combination with guide rails, that the orientation of the plate belt will be as horizontal as possible. Due to the articulated structural design, the chain is able to bow sideways and to transport also in this area goods placed on the plate belt. All the chain links have an identical structural design. They have a joint head on the front end thereof, said joint head being encompassed on the sides by the rear fork ends of the preceding chain link. Although this structural design is advantageous from the point of view of production technology, it is disadvantageous as far as stability is concerned.

A special structural design with horizontal and vertical link plates is known from GB 2123518A. In view of the rollers, which are arranged horizontally as well a vertically, such a structural design is not suitable for all the well-known types of conveyor chains, e.g. for a plate belt chain.

Another conveyor chain is known from U.S. Pat. No. 4,422,544.

It is therefore the object of the present invention to improve a side bow conveyor chain of the type specified at the beginning with respect to its stability characteristics.

According to the present invention, this object is achieved in that inner and outer chain links are provided in alternating succession, that an inner chain link comprises a reception sleeve on either end thereof and at least one inner link plate interconnecting said reception sleeves, that an outer chain link comprises a pivot bolt and a pivot pin on either end thereof and at least two outer link plates interconnecting the same, that each of the end faces of the at least two outer link plates laterally encompasses a reception sleeve of a neighbouring inner chain link, and that the inner and outer link plates, which are arranged such that they are set up on edge, extend vertically to the first axis when the chain moves straight ahead.

At first sight, this structural design seems to be a step backwards, since it necessitates the use of a larger number of parts, but substantial advantages are achieved by this structural design with regard to stability and with regard to the torsion resistance of the individual chain links of the chain. In particular the cranked fork shape used in the prior art is disadvantageous for reasons of stability, and this entails higher material costs, especially in cases in which plastic materials are used. The present invention makes use of an inner chain link having a completely new structural design and comprising a reception sleeve on either end thereof. Hence, the introduction of forces will almost be identical in these two end portions and the tensile forces can be transmitted by inner link plates having a simple structural design (preferably not cranked). It is true that plate link chains with inner and outer chain links are widely used, but the use of the two-axes chain hinge, which comprises a pivot bolt, a pivot pin and reception sleeves, necessitates a completely new structural design, the overall combination of which offers additional stability advantages. Although the chain is provided with a hinge that is pivotable about two axes, all the link plates are arranged in the same orientation in which they are set up on edge. A link plate is normally a plate-shaped structure. The term "set up on edge" means here that the link plate is set up on its narrow side and that the larger side faces are arranged at right angles to the first axis. An unequivocal preferential direction and a stability which is as uniform as possible over the whole length are achieved in this way.

According to a further embodiment, at least the inner link plates and the outer link plates of the inner and outer chain links can be produced from a plastic material, preferably from a high-strength plastic material. Due to the straight force transmission, a side bow conveyor chain having the lowest possible weight can be produced. In this respect, it will also be of advantage when the at least one inner link plate and the two reception sleeves of an inner chain link are produced from a plastic material in the form of an integral component. The production of the inner chain link, which has a comparatively complicated structural design, can be highly simplified by this measure. Especially the bonding of the inner link plates to the sleeve can be optimized with respect to advantageous stability characteristics.

According to a preferred embodiment, the pivot pins can project beyond a lower end face of the reception sleeves. The projecting end portions of the pivot pins can thus be used for guiding the chain when it bows sideways. A suitably shaped sprocket engages the gaps between the pivot pins and guides the chain along the side bow. Additional surfaces of the chain can here rest on the sprocket or on a guide structure. The sprocket can also be used for driving the chain.

In order to prevent, as far as possible, an accumulation of dirt in the area of the chain, which is also used for conveying foodstuff, the reception sleeves can be implemented such that they are closed at the upper end thereof and have thus a cup-shaped structural design. The closed end offers the possibility of forming a stop surface also in the interior of the reception sleeve; this stop surface allows easier mounting, when e.g. the pivot bolt is passed through the pivot pin.

In order to impart to the side bow conveyor chain the best possible side bow flexibility, in spite of the fact that inner and outer chain links are used, a further embodiment can be implemented such that the outer link plates have on the inner side thereof a centering projection encompassing the pivot bolt at least in certain areas thereof, the distance between two opposed centering projections corresponding essentially to the diameter of the reception sleeve arranged therebetween. It goes without saying that the distance is chosen such that the reception sleeve can be pivoted between the two centering projections. The amount of play is, however, dimensioned such that an additional instability component will be avoided. This has the effect that the inner chain link will have a slightly narrower width at this point, but it is still guided by the centering projections.

According to a preferred embodiment, a longitudinal center line of the centering projection can extend in a plane which is oriented essentially at right angles to a longitudinal center line of the outer chain link and through which the first axis extends, the centering projections extending over at least 50% of the height of the inner link plate. Especially when the chain bows sideways and when the individual chain links have an otherwise straight orientation relative to one another, the inner chain link will, in the case of such a structural design, be guided by the centering projection over at least 50% of its height, whereby also moments about the longitudinal center line will be absorbed by the centering projection.

In addition, an outer surface of the at least one inner link plate of an inner chain link can be oriented essentially tangentially to the outer circumferential surface of the reception sleeve, the transition region between the inner link plate and the reception sleeve having formed therein a longitudinal groove which extends essentially at right angles to the first axis and a longitudinal axis of the inner chain link and which has a cross-section that is adapted to the cross-section of the centering projection. This has the effect that the centering projection will not directly come into contact with a sharp transition region between the inner link plate and the reception sleeve as a stop surface, and that the chain will be able to bow sideways in an even narrower side bow because the groove allows the centering projection to pivot further into the transition region.

Another possibility of allowing the chain to bow sideways in a narrower side bow is given when the distance between an outer surface of the at least one inner link plate of an inner chain link and the longitudinal center line of the inner chain link is smaller than half the width of the reception sleeve. Due to the fact that the inner link plate is set back relative to the reception sleeve, the centering projection can be pivoted farther about the reception sleeve.

Another measure for accomplishing a narrower side bow is to be seen in a variant in the case of which the distance between the inner surfaces of the at least two outer link plates increases continuously between the pivot bolt and the end face area of the outer link plates. When seen from above, a kind of funnel is defined, whereby the end face area of the outer link plates will remain longer out of contact with the side faces of the inner link plates. In this respect, it proved to be advantageous when the two inner surface sections at the end face areas of the at least two outer link plates open relative to one another in an angular range of from 15° to 45°. Normally, the outer link plates of outer chain links are only interconnected by the pivot bolts. One embodiment of the present invention is, however, so conceived that the at least two outer link plates of the outer chain link are interconnected by means of at least one cross web extending between the reception sleeves of neighbouring inner chain links. This imparts to the outer chain link an additional stabilizing component, which will especially be of advantage when the chain bows sideways. In particular when the components in question are made of plastic material, it will be very easy to produce such a cross web or such a plurality of cross webs integrally with the outer link plates.

According to an advantageous embodiment, a plurality of cross webs can be provided, said cross webs encompassing the end face areas of the neighbouring inner chain links at least partially, thus defining reception bays for the reception sleeves. This, however, also means that the cross webs are connected to the outer link plates at a point located as closely as possible to the pivot bolt, whereas they merge in the middle of the outer chain link due to their reception bay-defining shape. In these reception bays, the reception sleeves can be pivoted about the second axis without being hindered by the cross webs. The reception bays can be implemented such that they are essentially fittingly adapted to the reception sleeves, with the smallest possible amount of play being provided.

The respective cross webs may, however, also form straight portions which approach the reception sleeve as closely as possible.

In order to increase the strength of the connection between the pivot bolts and the outer link plate, the outer sides of the outer link plates can have provided thereon sleevelike projections for accommodating the pivot bolt ends in accordance with a further embodiment. Such fastening of the pivot bolts to the outer link plates will be particularly suitable in the case of outer link plates made of plastic material, and pivot bolts which consist of steel.

Irrespectively of possibly provided sleevelike projections, the end portions of the outer link plates can be reinforced at least in the area of the pivot bolts. This is the zone where the highest load acts on the outer link plates; hence, this reinforcement does definitely make sense. In the case of outer link plates made of plastic material such a reinforcement, which is rarely provided for steel link plates in the prior art, is very easy to accomplish.

In order to adapt, as far as possible, also the inner chain link to tensile loads occurring in the chain, the reception sleeves may, in a plane extending at right angles to the longitudinal center line of the inner chain link and along the second axis, have a wall thickness which exceeds the wall thickness in a plane rotated by 90° about the second axis. A reduced wall thickness at the top end of the inner chain link provides better possibilities of movement when the reception sleeve is pivoted about the first axis. At right angles thereto, the wall thickness will, however, be sufficiently large so as to obtain the desired strength.

A side bow conveyor chain according to the present invention is particularly suitable for use as a plate belt chain. For this purpose, the chain is so conceived that a plate belt consisting of individual support plates is provided, and that the support plates are connected to the outer and/or inner chain links. It will here be advisable to use integral, fixed connections or releasable connections. Hence, the support plates can be connected to the outer and/or inner chain links by means of detent units. In the case of releasable connections, the support plates can be replaced if they should be damaged. Also the assembly will be simplified by such releasable connections.

In order to reduce, as far as possible, the size of the gaps which are formed between the individual support plates and which may impair the transport of goods, in particular of small-sized goods, the support plates can be in toothed engagement with one another according to an advantageous embodiment. It will be of advantage when the contour of a support plate is essentially point symmetric. This has the effect that only a single support plate shape will have to be used for obtaining nevertheless interengaging teeth, whereby the component diversity will be reduced.

For further stabilizing the support plates, another embodiment can be so conceived that the inner chain links and/or the outer chain links are provided with plug-in reception means, a plug-in projection of a respective associated support plate being in positive engagement with said plug-in reception means and being secured in position by means of the additional detent units.

In the following, embodiments of the present invention will be explained in detail on the basis of a drawing, in which.

Figure 1:
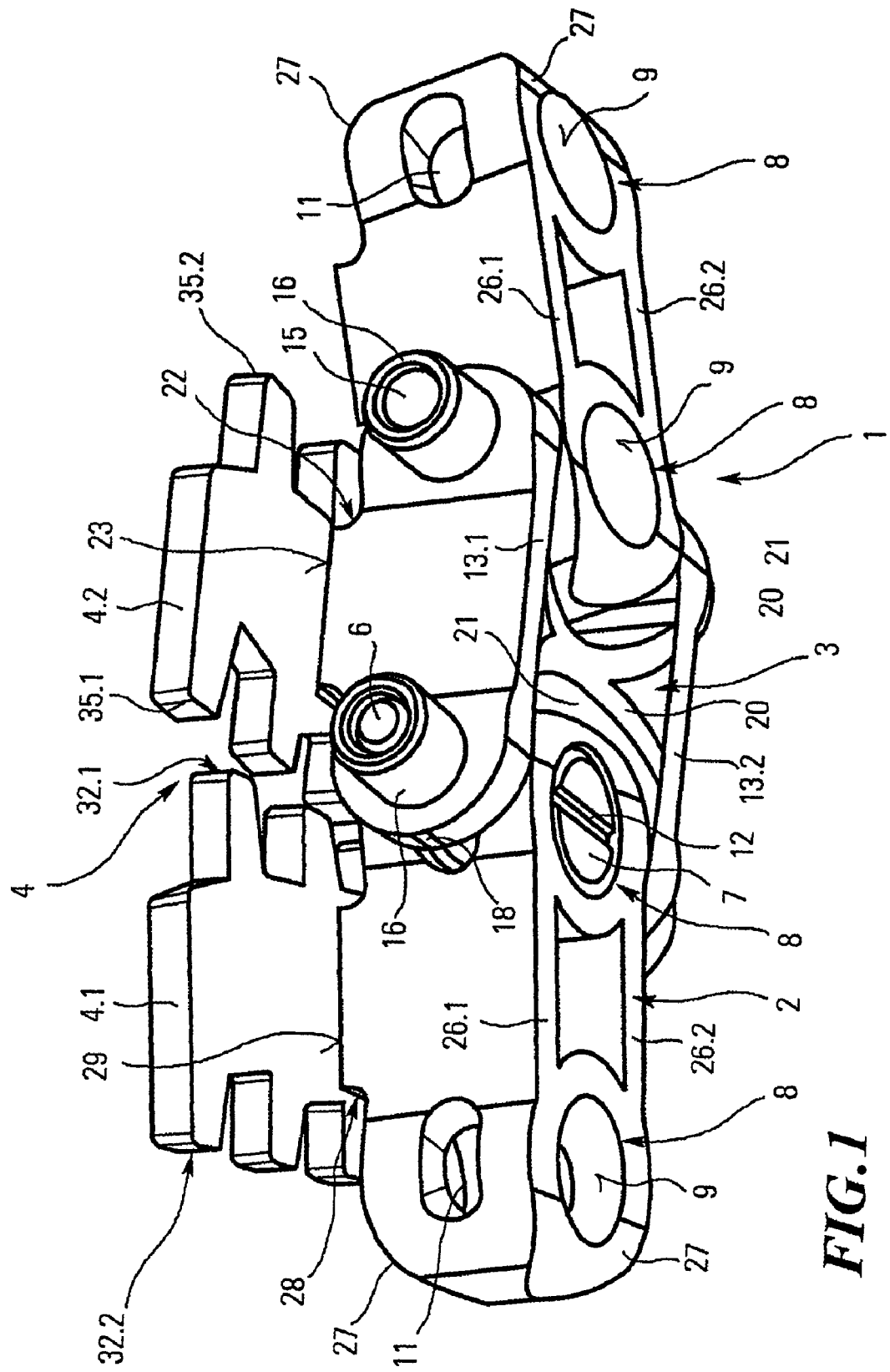
FIG. 1 shows a perspective side view of a first side bow conveyor chain.
Figure 2:
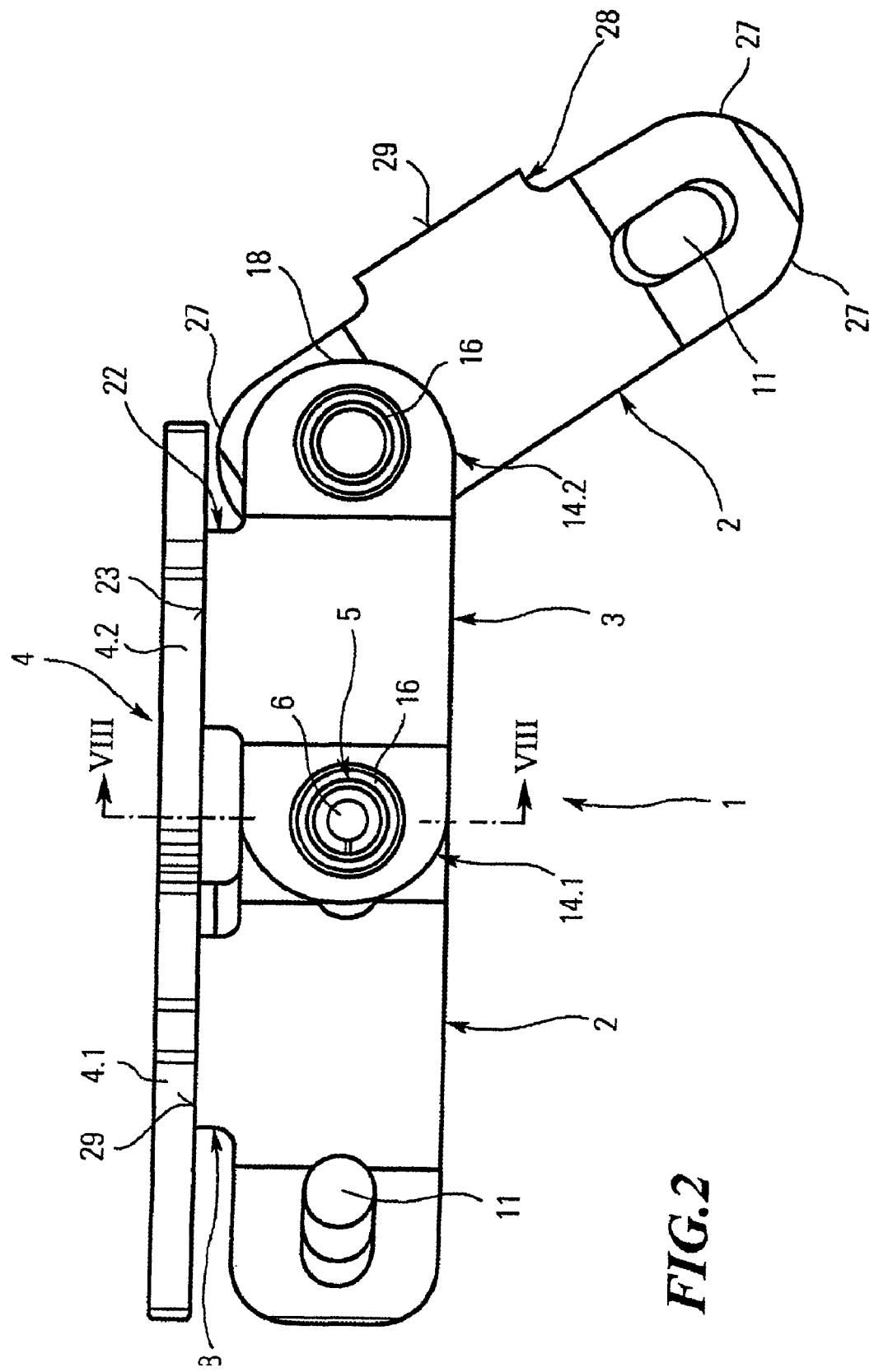
FIG. 2 shows a side bow conveyor chain according to FIG. 1 in a side view.
Figure 3:
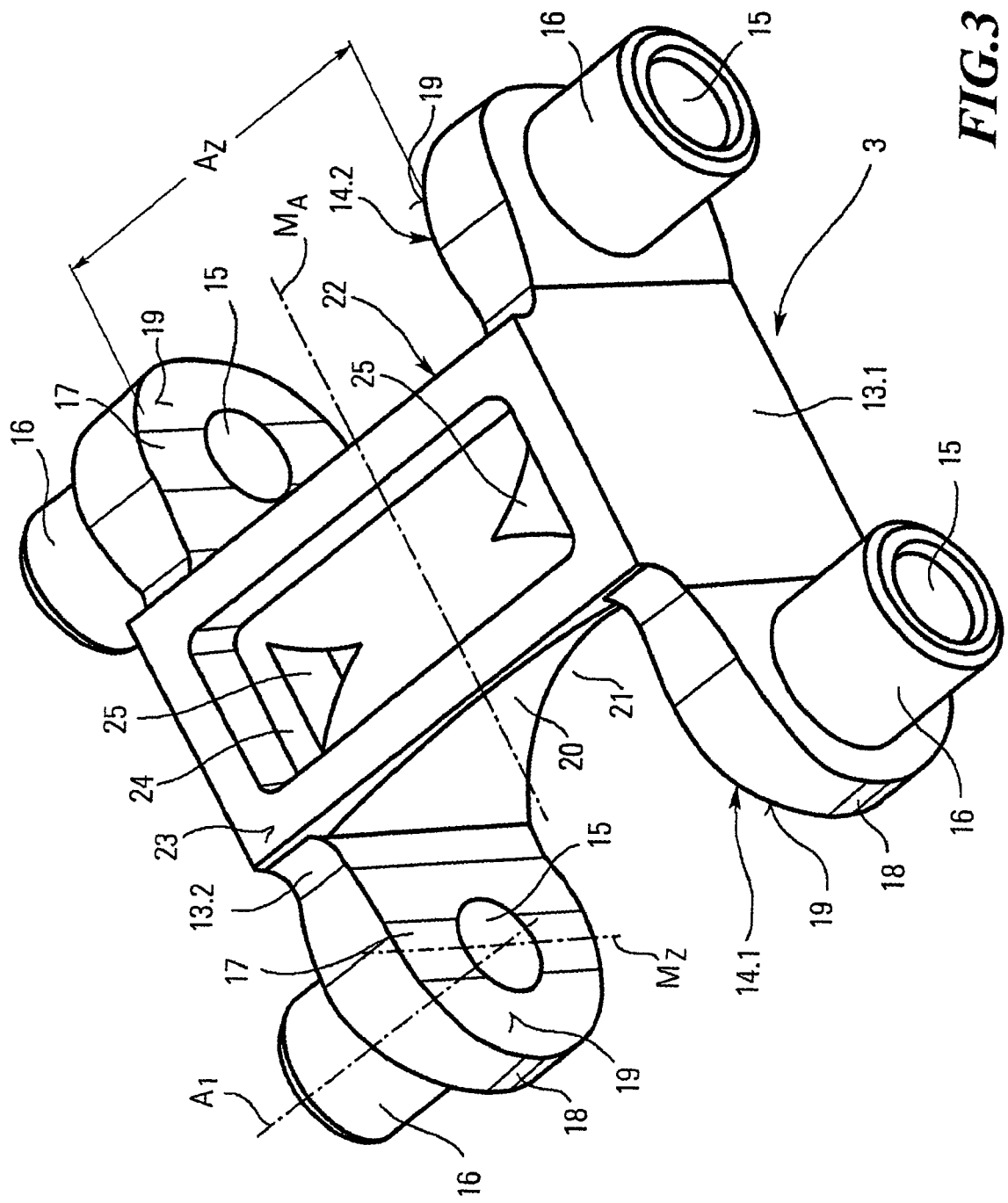
Figure 4:
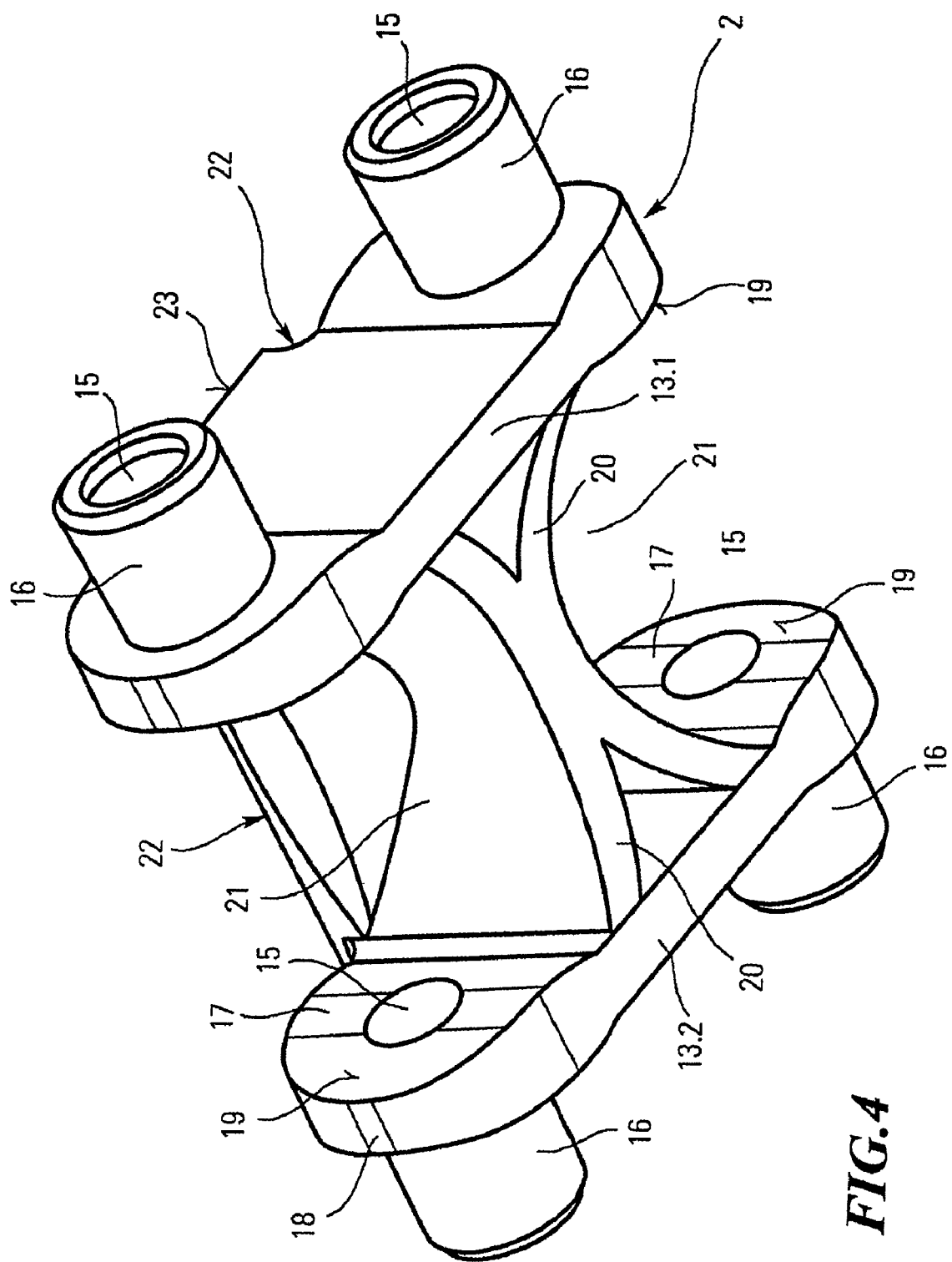
Figure 5:
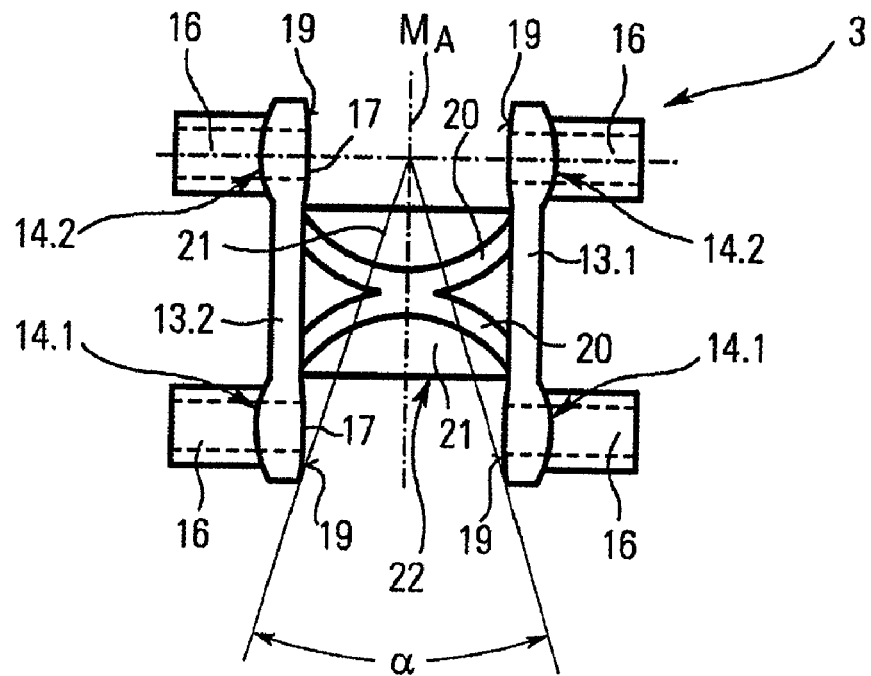
Figure 7:
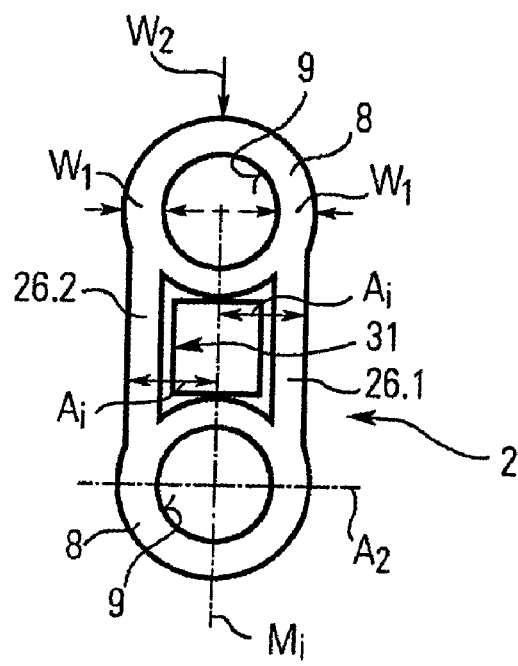
Figure 6:
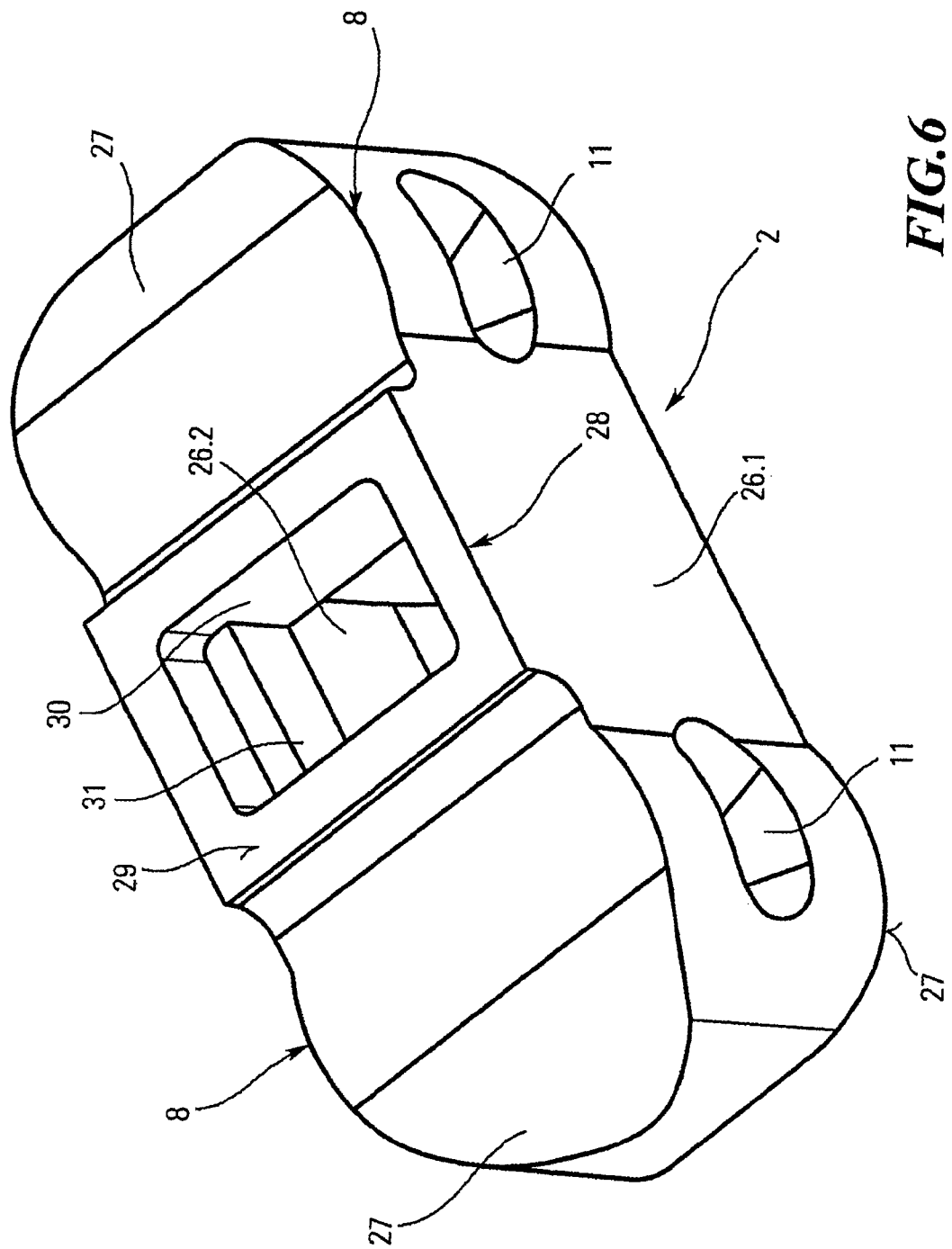
Figure 9:
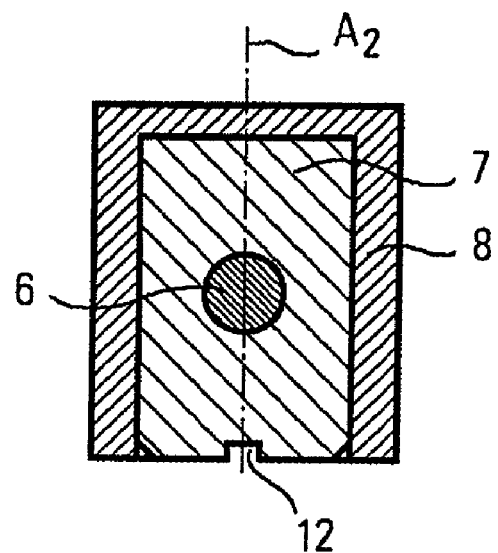
Figure 8:
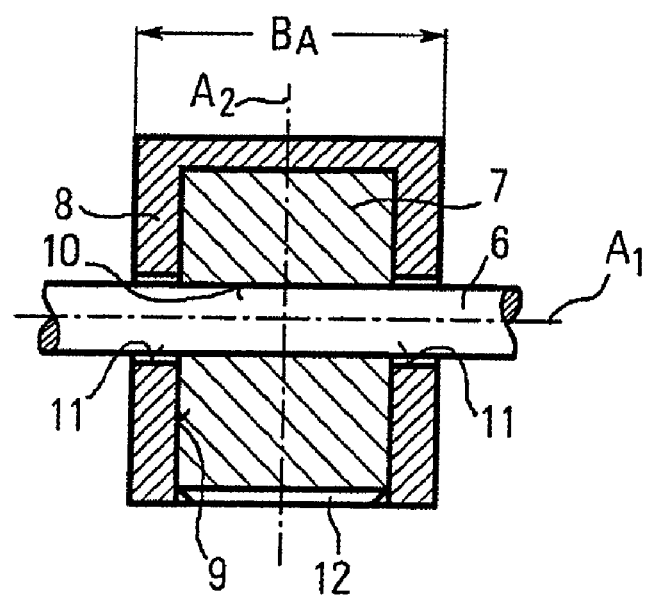
Figure 10:
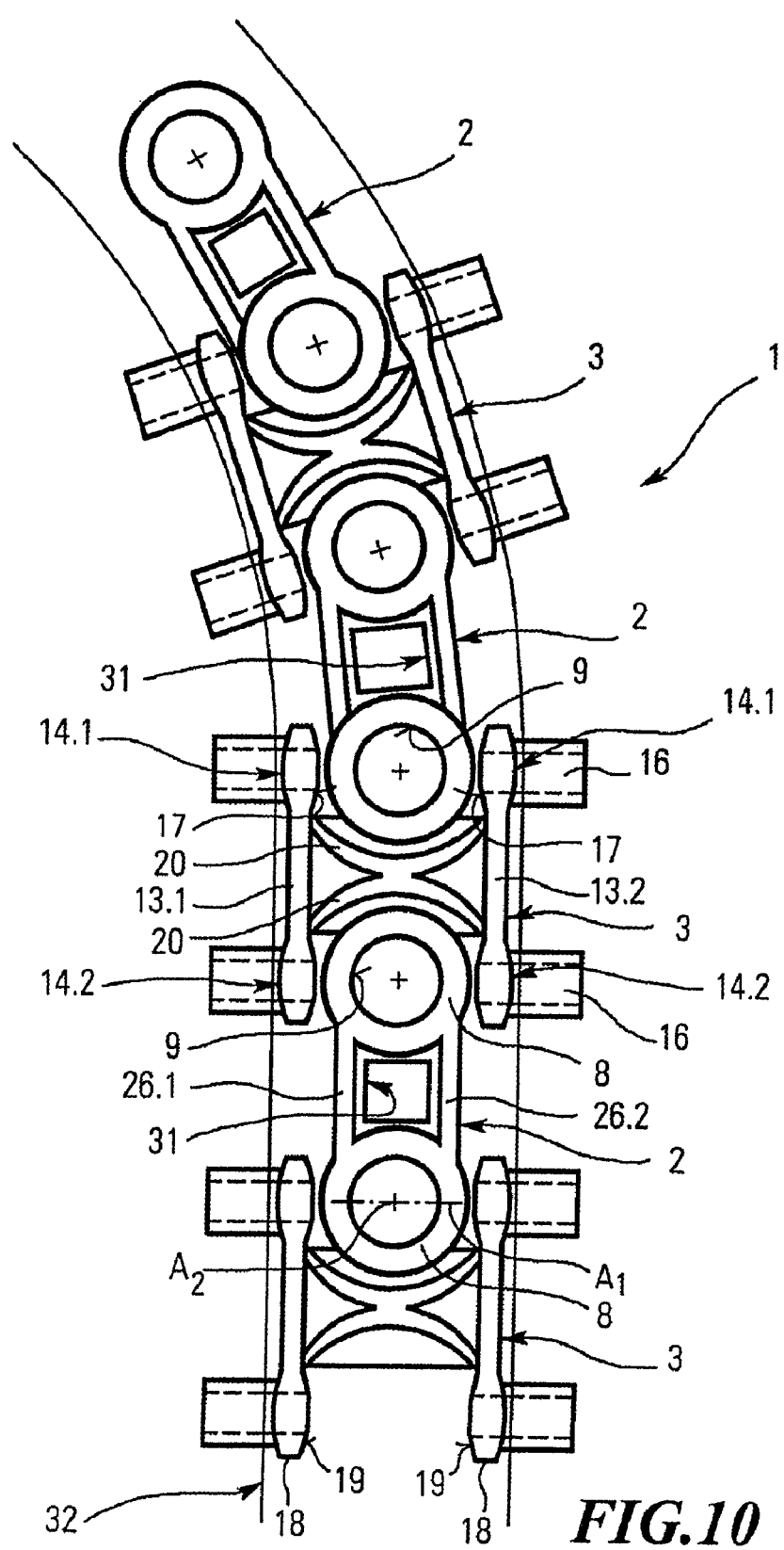
Figure 11:
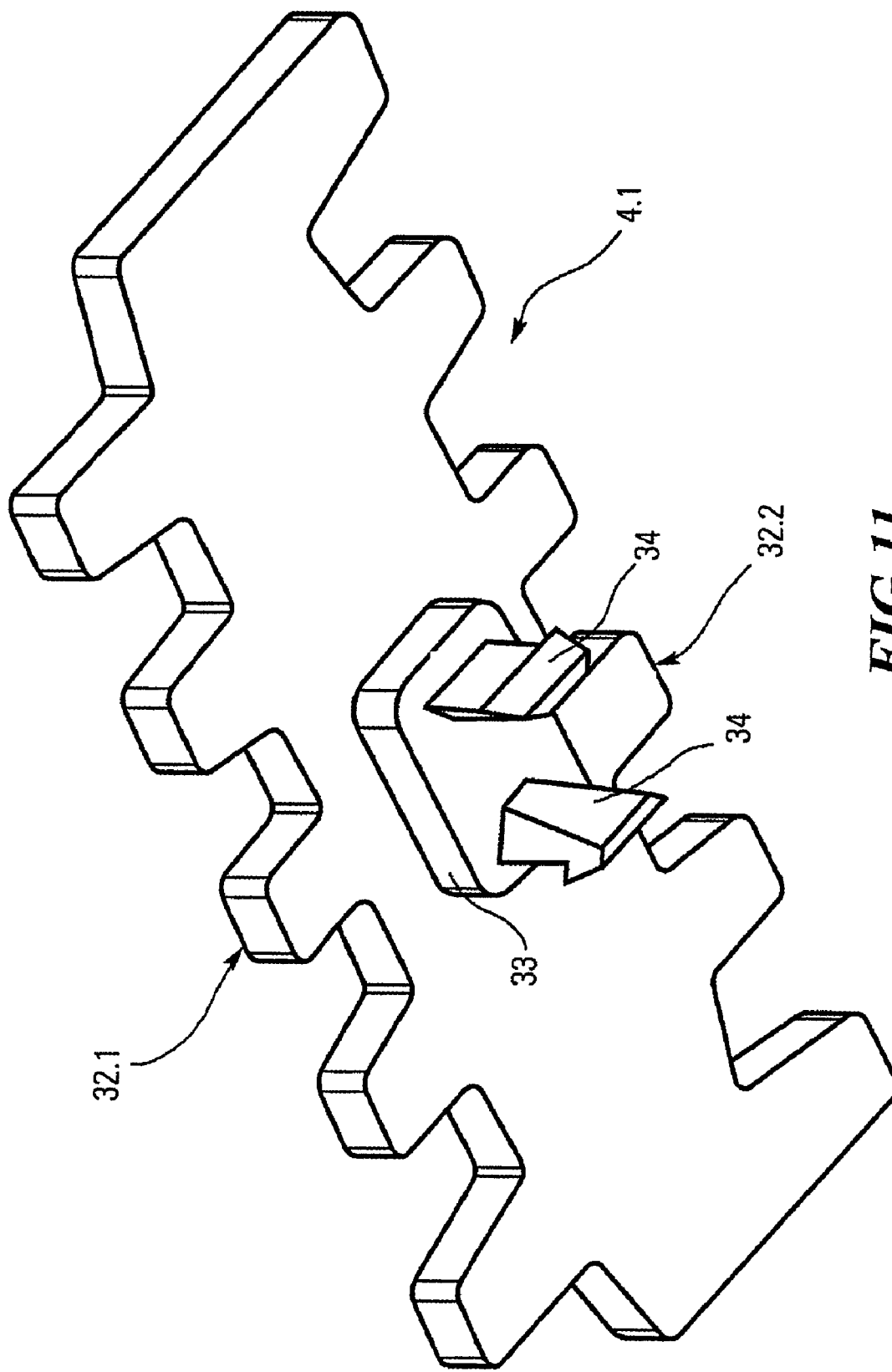
Figure 12:
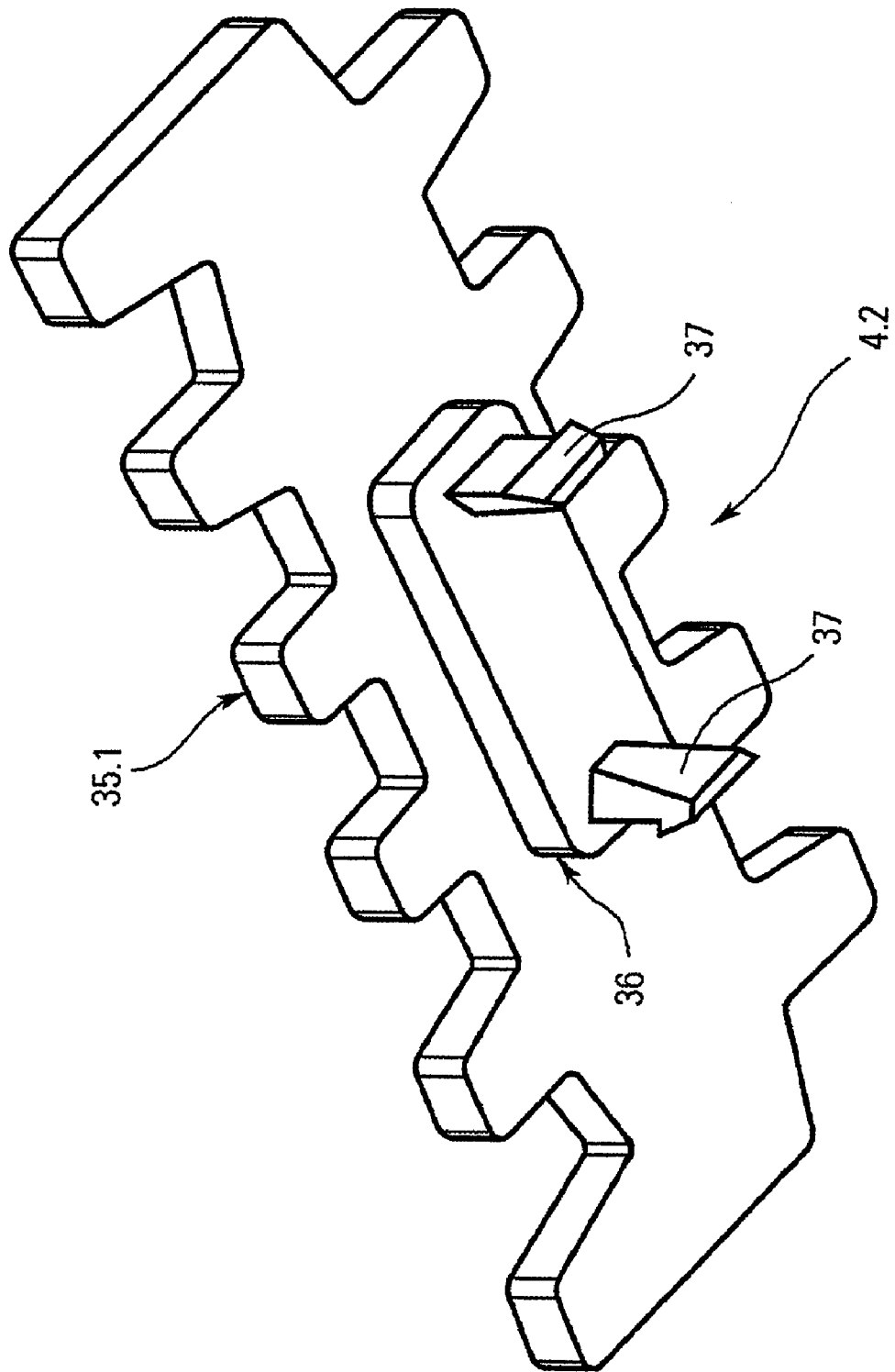
Figure 13:
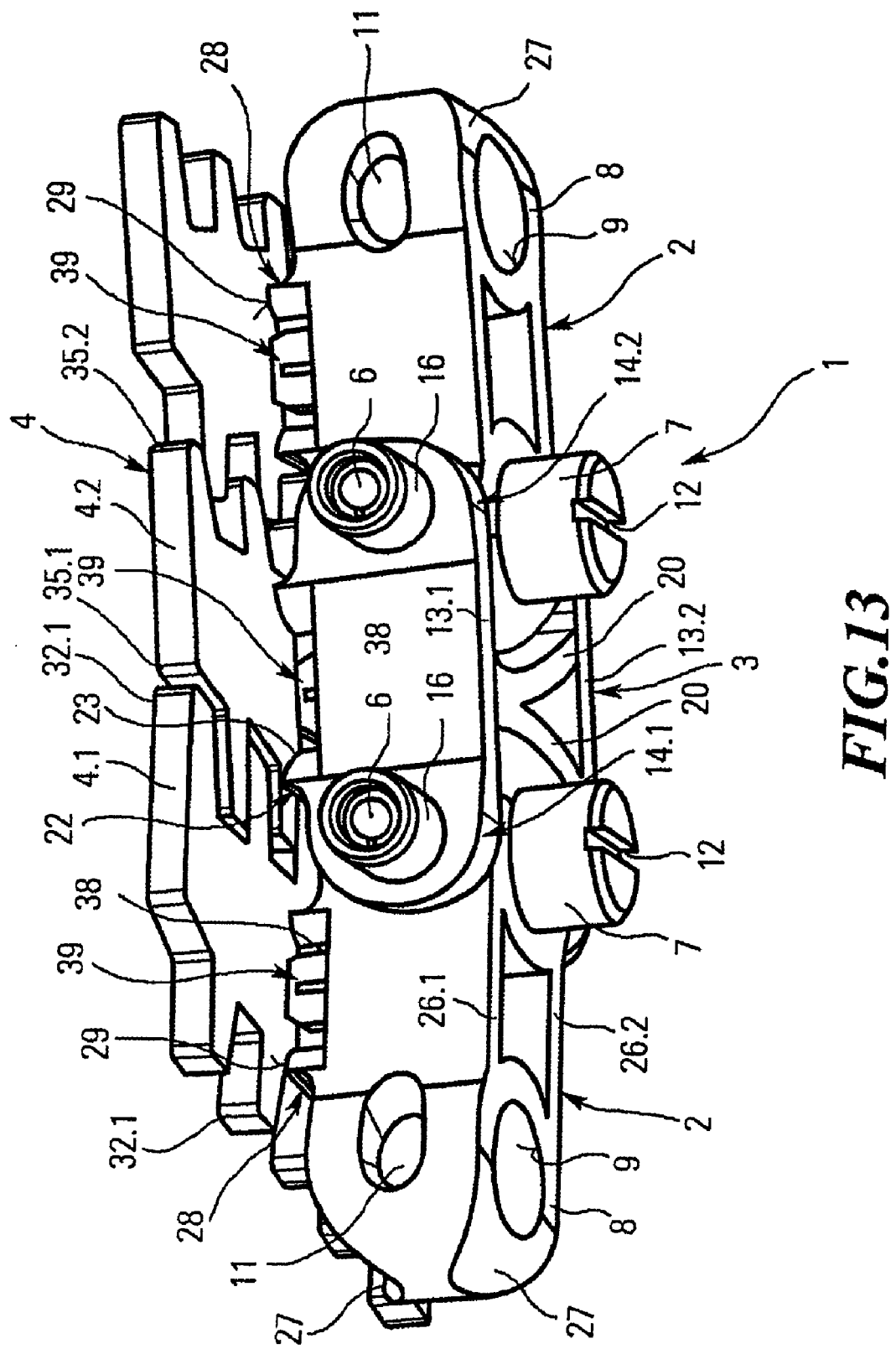
Figure 14:
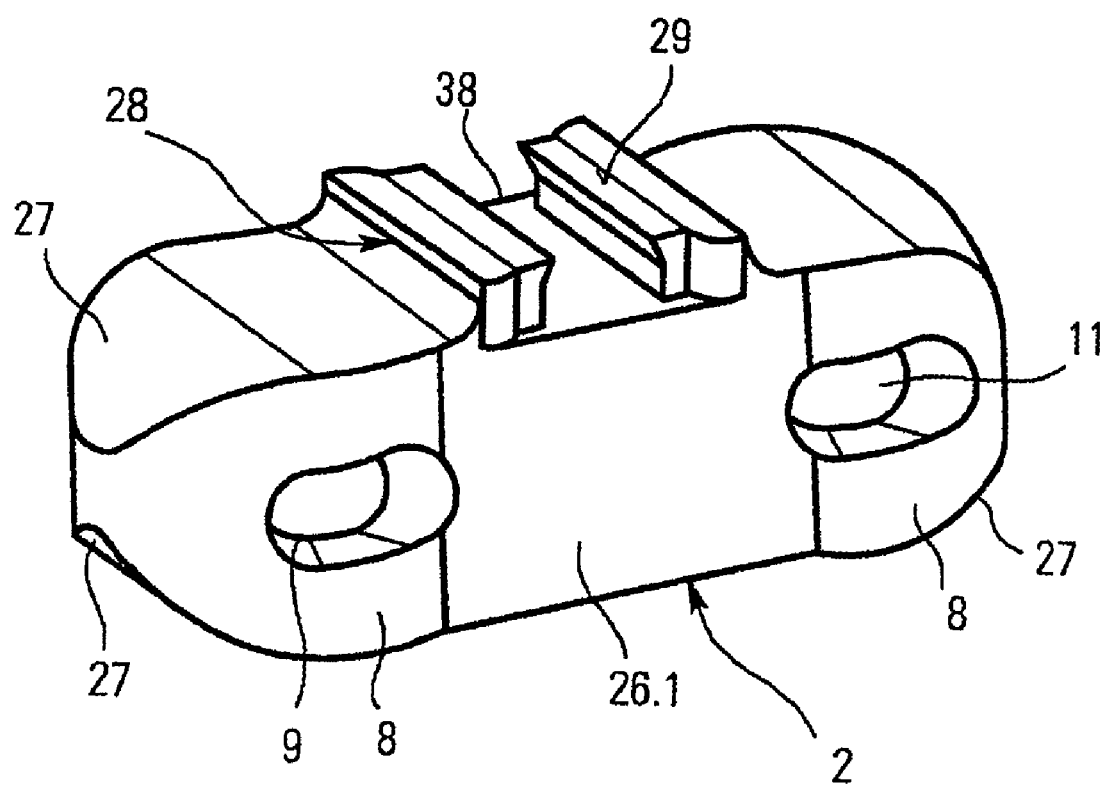
Figure 15:
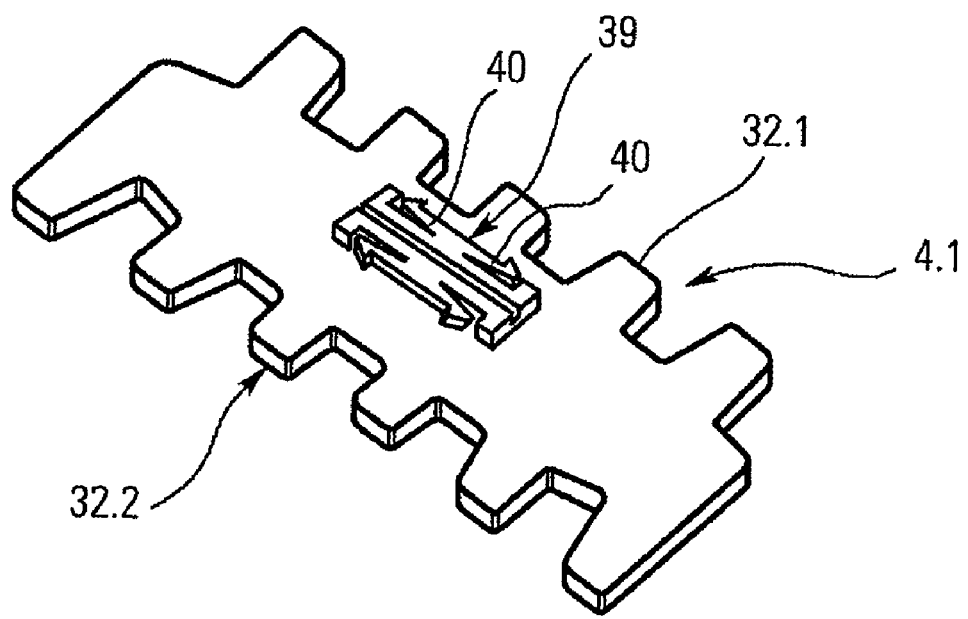
Figure 20:
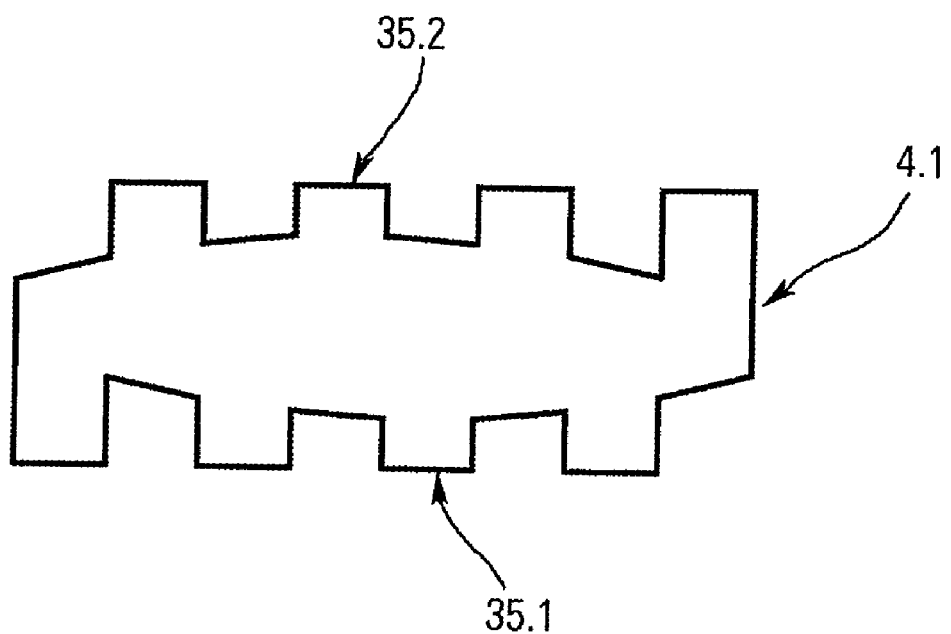
Figure 16:
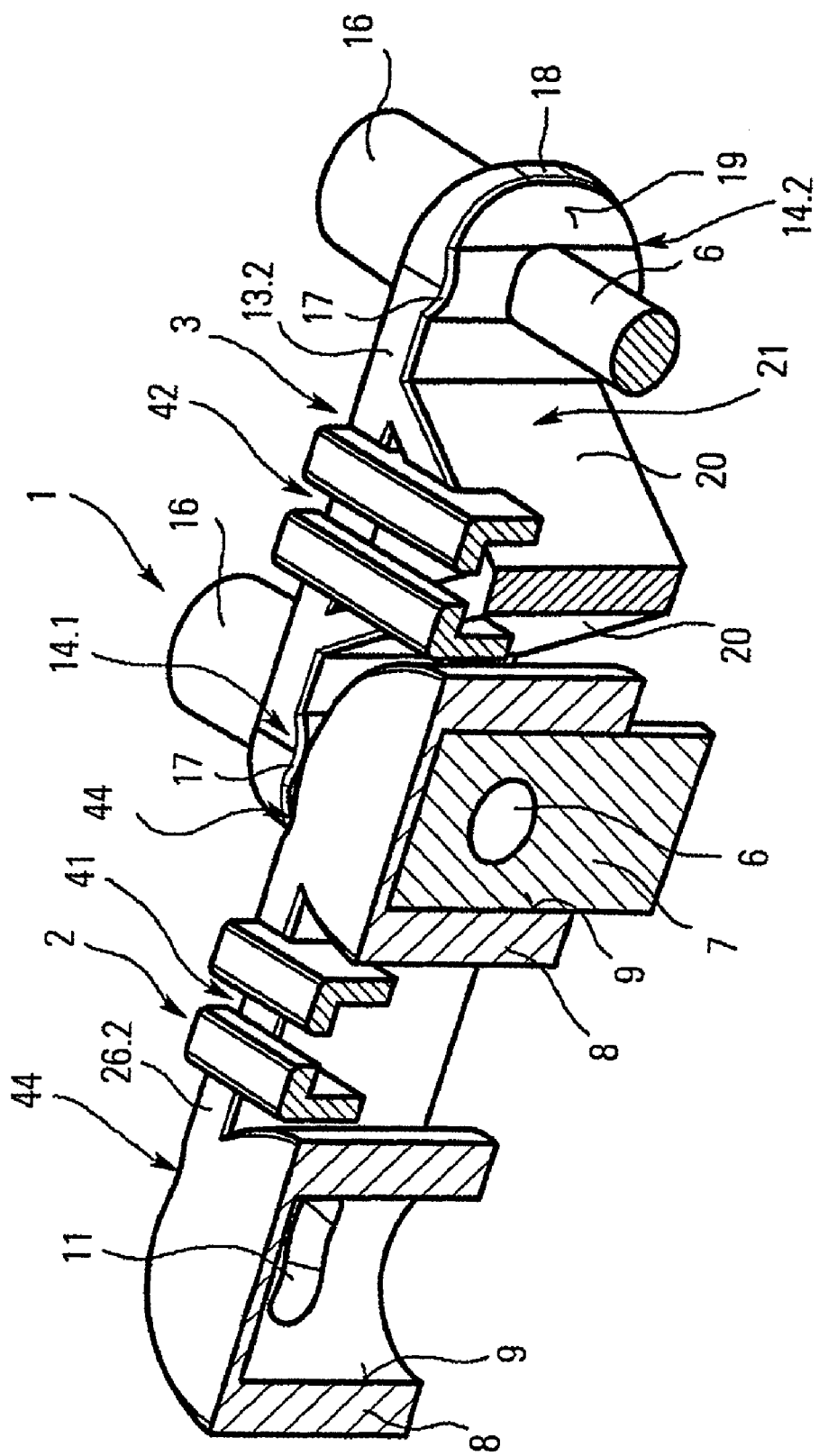
Figure 17:
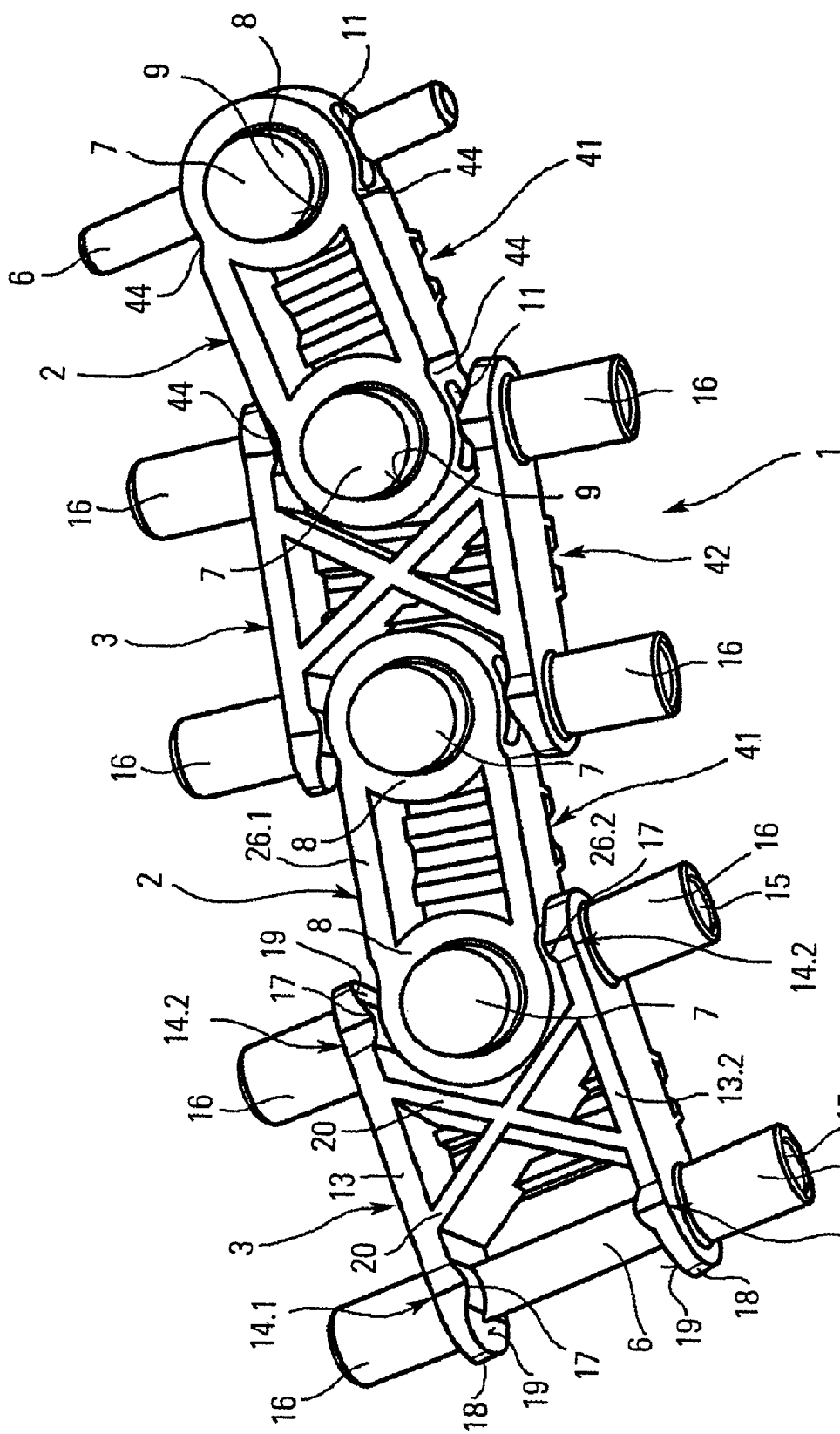
Figure 18:
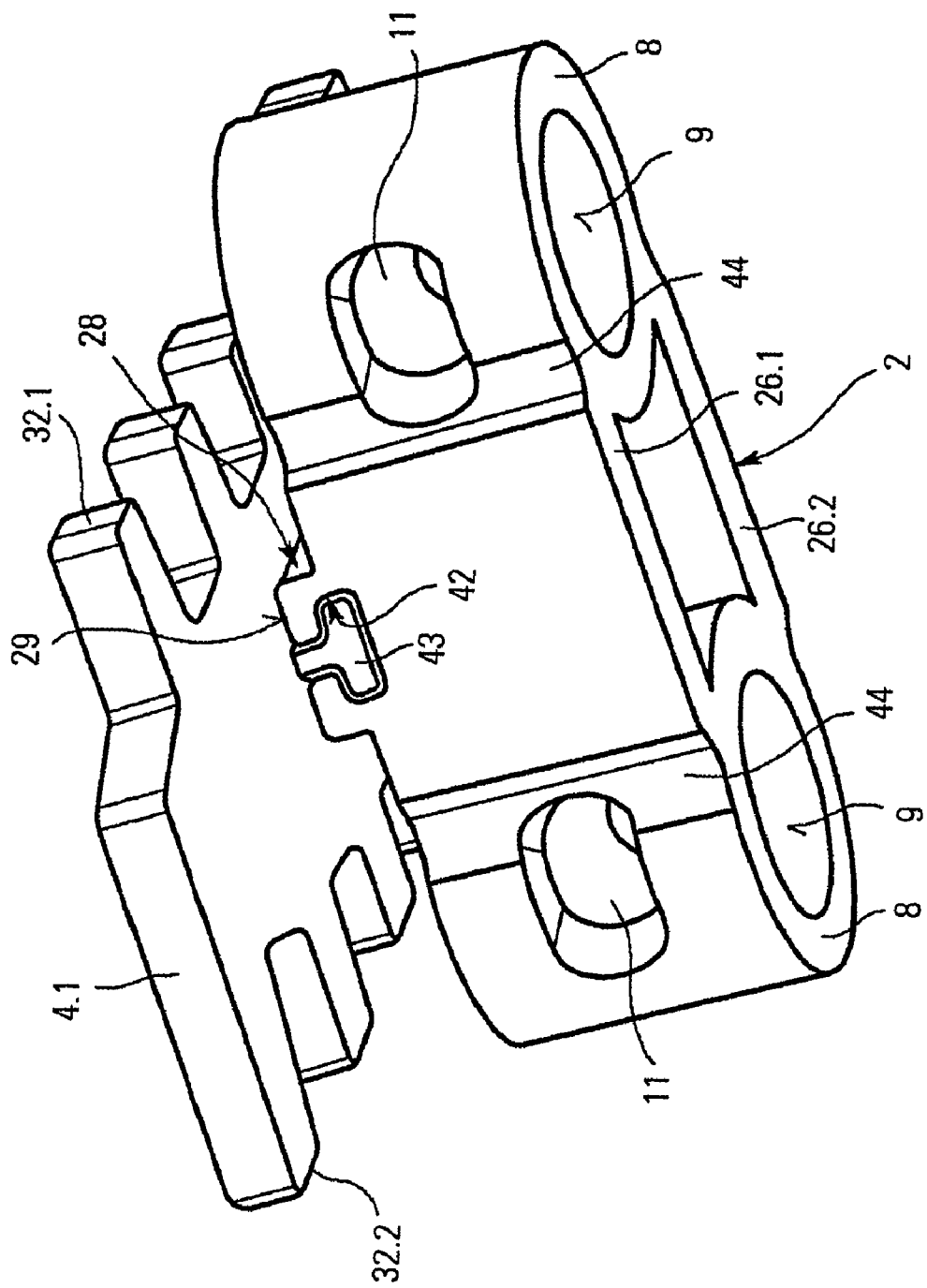
Figure 19:
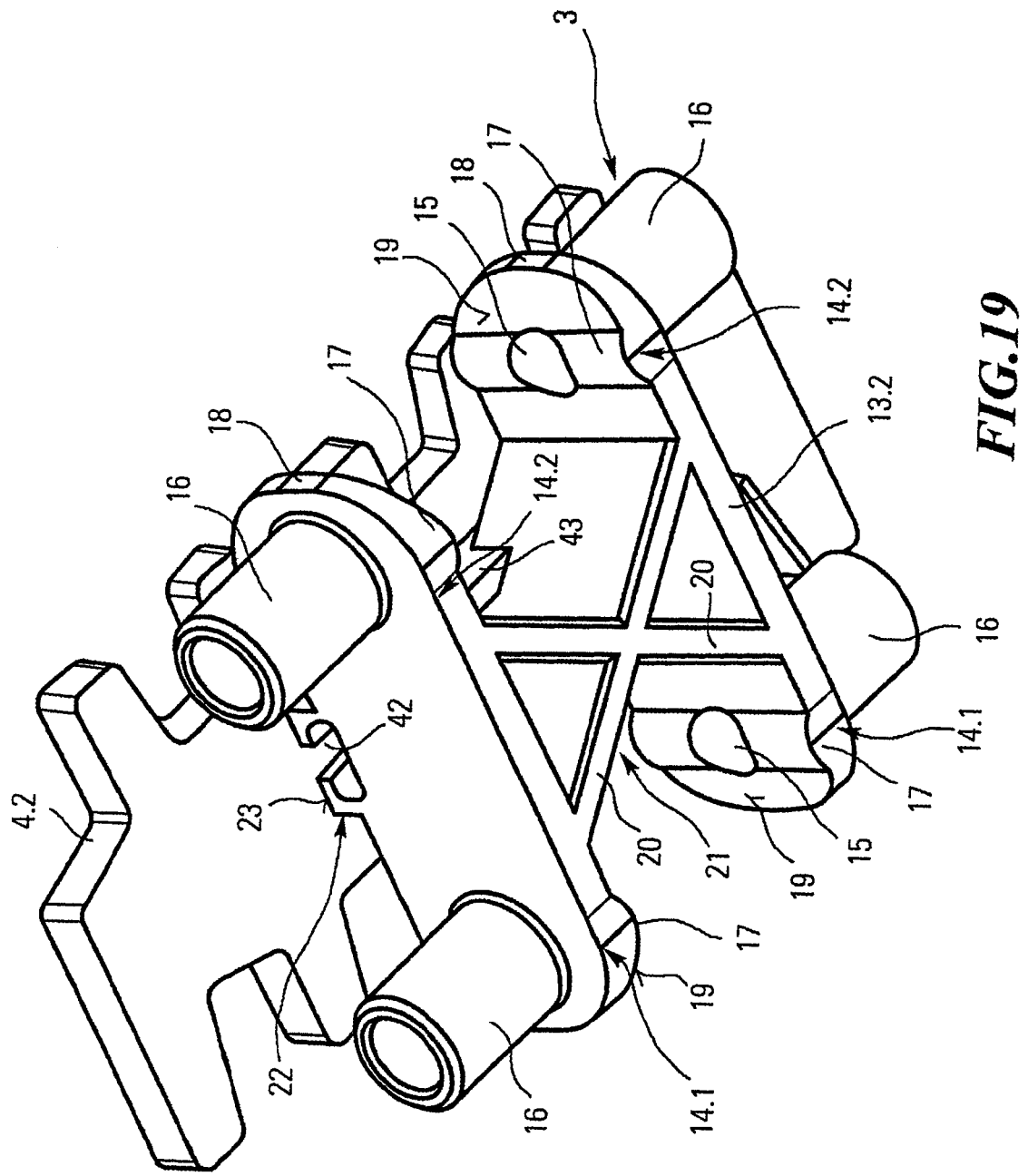

FIG. 3 shows an enlarged perspective top view of an outer chain link of the chain according to FIG. 1, FIG. 4 shows a perspective bottom view of the outer chain link according to FIG. 3, FIG. 5 shows a bottom view of the outer chain link according to FIG. 3, FIG. 6 shows an enlarged perspective top view of an inner chain link of the chain according to FIG. 1, FIG. 7 shows a bottom view of the inner chain link according to FIG. 6, FIG. 8 shows a sectional view of a chain hinge according to FIG. 2 cut along the line VIII-VIII, FIG. 9 shows the chain hinge according to FIG. 8 in a sectional view rotated by 90°, FIG. 10 shows a bottom view of the side bow conveyor chain according to FIG. 1; for reasons of simplicity, the support plates are here not shown, FIG. 11 shows an enlarged perspective bottom view of a support plate for connection to an inner chain link, FIG. 12 shows an enlarged perspective view of a support plate for connection to an outer chain link, FIG. 13 shows a perspective side view of a second embodiment of a side bow conveyor chain, FIG. 14 shows a perspective side view of an inner chain link according to FIG. 13, FIG. 15 shows a support plate for connection to the inner chain link according to FIG. 14 and the outer chain link according to FIG. 13, FIG. 16 shows a third embodiment of a side bow conveyor chain in a perspective full section view, FIG. 17 shows a side bow conveyor chain according to FIG. 16 in a perspective top view, FIG. 18 shows an enlarged perspective representation of an inner chain link according to FIG. 16 in a condition in which the support plate is attached, FIG. 19 shows an enlarged perspective view of an outer chain link according to FIG. 16 in a condition in which the support plate is attached, and FIG. 20 shows a top view of a support plate variant which is asymmetric in shape.

Making reference to FIG. 1 to 12, a first embodiment of a side bow conveyor chain 1 according to the present invention (called: chain in the following) will be explained in detail. The chain 1 comprises inner chain links 2 and outer chain links 3 which are arranged in alternating succession as well as a plate belt 4 arranged on the chain links 2 and 3 and defined by individual support plates 4.1 and 4.2. The connection of an inner chain link 2 and of an outer chain link 3 is established via a chain hinge 5 which is implemented such that it is pivotable about a first axis $A_1$ (in FIG. 8 horizontal) as well as about a second axis $A_2$ (in FIG. 8 vertical). Each chain hinge 5 comprises a pivot bolt 6 and a cylindrical pivot pin 7 as well as a reception sleeve 8 which is implemented as a component part of the inner chain link 2 and which accommodates the pivot pin 7 as well as the pivot bolt 6. The pivot pin 7 is arranged in a base hole 9 of the reception sleeve 8 such that it is pivotable about the axis $A_2$. The pivot pin 7 is provided with a hole 10 which extends transversely therethrough and into which the pivot bolt 6 is inserted. The reception sleeve 8 is provided with lateral pivot openings 11 having the shape of elongated holes so as to allow the pivot bolt 6 to laterally exit the reception sleeve 8. The reception sleeve 8 is closed at the upper end thereof. The pivot pin 7 has a slot 12 at the lower end thereof, which serves to align the pivot pin 7 during assembly. The axes $A_1$ and $A_2$ extend substantially at right angles to one another. A displacement up to 10% of the chain pitch is, however, possible as well.

The respective ends of the pivot bolt 6 are connected to the outer chain link 3. On the basis of this structural design of the chain hinge 5, the chain 1 can be pivoted in two directions so that, on the one hand, it can be driven in the usual way by a sprocket (not shown) and so that, on the other hand, it will be able to bow sideways.

Making reference to FIG. 3 to 5, the structural design of the outer chain link 3 will now be explained in more detail.

The outer chain link 3 comprises two parallel outer link plates 13.1 and 13.2 which are arranged such that they are set up on edge. The end portions 14.1 and 14.2 of the outer link plates 13.1 and 13.2 are increased in width at least in the area of their openings 15. In addition, these end portions 14.1 and 14.2 are provided with sleevelike projections 16 on the outer side thereof, the opening 15 continuing in each of said sleevelike projections 16. The opening 15 and, consequently, also the sleevelike projections 16 serve to accommodate the end portions of the pivot bolts 6. A chain-drive sprocket, which is not shown in detail, engages with its teeth the gap between the sleevelike projections 16 when the chain is being deflected about the first axis $A_1$. The number of gaps on either side corresponds to the number of all the chain links.

On the inner sides of the end portions 14.1 and 14.2, the outer link plates 13.1 and 13.2 each comprise a centering projection 17 (raised centering portion) representing a lateral guide means for the reception sleeve 8. Towards the end face 18, the thickness of the outer link plates 13.1 and 13.2 decreases. In particular on the inner side of the end portions 14.1 and 14.2, funnel faces 19 are formed, which, symmetrically with respect to a longitudinal center line $M_A$ of the outer chain link 3, enclose together an aperture angle α of approx. 36° (between 15° and 45°). The apex of the angle α is located on the axis $A_1$ of the neighbouring chain hinge 5 on the same outer chain link 3. The centering projection 17 extends over the entire height of the end portions 14.1 and 14.2 (i.e. over more than 50% of the height of the end portion). Hence, a longitudinal center line $M_z$ of the centering projection 17 extends in a plane which is oriented substantially at right angles to the longitudinal center line $M_A$ and through which the first axis $A_1$ extends.

The two plate-shaped outer link plates 13.1 and 13.2 are interconnected by means of arcuate cross webs. In the present case, two cross webs 20 are provided. Due to the arcuate shape, the cross-web end portions, which are connected to the outer link plates 13.1 and 13.2, approach the end portions 14.1 and 14.2 as closely as possible, whereas in the central area said cross webs 20 merge with one another, thus forming reception bays 21 which serve to accommodate the reception sleeves 8 as fittingly as possible. On the upper side of the outer chain link 3, an upwardly projecting cover plate 22 is provided. The supporting side 23 of the cover plate 22 serves to support the lower surface of the associated support plate 4.2. The cover plate 22 has formed therein a rectangular plug-in reception means 24 provided with triangular detent openings 25 in its bottom.

The whole outer chain link 3 consists of a reinforced plastic material and is produced as an integral component by a suitable moulding process, preferably by injection moulding.

The distance $A_Z$ between two opposed centering projections 17 corresponds essentially to the width $B_A$ (cf. FIG. 8) of the reception sleeve 8.

Making reference to FIGS. 6 and 7, the structural design of the inner chain link 2 will now be explained in more detail.

The inner chain link 2 comprises two parallel, spaced-apart inner link plates 26.1 and 26.2 which are arranged such that they are set up on edge. The inner link plates 26.1 and 26.2 merge with the reception sleeves 8 at their end portions, and they interconnect the two reception sleeves 8 of an inner chain link 2. The distance $A_I$ between an outer surface of the inner link plates 26.1 and 26.2 and the longitudinal center line $M_i$ is smaller than the width $B_A$ of the reception sleeve 8, whereby the inner link plates 26.1 and 26.2 are slightly displaced inwards relative to the reception sleeve 8. By making use of different radii with different centres, it is achieved that the wall thickness $W_1$ is larger than the wall thickness $W_2$ which is displaced by 90°. This produces two effects. On the one hand, the larger wall thickness $W_1$ is located in the zone of highest stress, i.e. it reinforces the reception sleeve 8. On the other hand, the reduced wall thickness $W_2$ provides room for pivoting the reception sleeve 8 about the second axis $A_2$ within a reception bay 21. In addition, the reception sleeve 8 is rounded in a suitable manner on the upper and lower sides thereof. As can be seen from FIG. 2, this rounded portion 27 allows the end portion of the inner chain link 2 to be pivoted about the axis $A_1$ below the support plate 4.2, without coming into contact with the latter (cf. FIG. 2).

The inner chain link 2 has on the upper side thereof a cover plate 28 whose upwardly facing support surface 29 comes into contact with the lower surface of an associated support plate 41. For this purpose, the cover plate 28 is provided with a plug-in reception means 30 in the interior of which detent projections 31 are provided on two opposed sides.

Especially on the basis of FIG. 10, it can be seen from below how the inner and outer chain links 2, 3 cooperate during a sideway movement. The pivot bolt 6 and the pivot pin 7 are not shown in said figure for reasons of simplicity. A guide track 32 can be provided, which guides the outer link plates 13.1 and 13.2 on the sides. The sleevelike projections 16, which are reinforced by the end portions of the pivot bolts 6, will then rest on the guide track. In the upper area, it can especially be seen how the inner chain link 2 can be pivoted about the second axis $A_2$ relative to the outer chain link 3. Due to the inwardly-displaced inner link plates 26.1 and 26.2 and the funnel faces 19, the pivot range can be extended as shown. This has the effect that, in spite of the use of inner chain links 2 and outer chain links 3, no impairment of the radius of the side bow in comparison with hitherto used embodiments has to be put up with.

FIG. 11 shows a support plate 4.1 for an inner chain link. The support plate 4.1 is provided with teeth 32.1 on the front edge thereof as well as with complementary teeth 32.2 on the rear edge thereof. The pivoting about the axis $A_2$ is accounted for by an arcuate shape in the tooth base of the teeth 32.1 and 32.2. Whereas the upper surface of the support plate 4.1 is planar, the lower surface is provided with a plug-in projection 33 which is adapted to be fittingly inserted in the plug-in reception means 30. On the lower surface of the plug-in projection 3, two resilient detent hooks 34 project. These detent hooks 34 are adapted to be pushed over the detent projections 31 provided on the base of the plug-in reception means 30 and to be locked in position on the underside of said detent projections 31.

The support plate 4.2 for an outer chain link 3, which is shown in FIG. 12, has a similar structural design. The support plate 4.2 is provided with teeth 35.1 on the front edge thereof as well as with complementary teeth 35.2 on the rear edge thereof. For allowing the pivotal movement about the axis $A_2$, the teeth 35.1 and 35.2 have a suitable arcuate shape in the tooth base. Also in this case, the upper surface of the support plate 4.2 is planar, whereas the lower surface is provided with a plug-in projection 36 with downwardly projecting detent hooks 37. The plug-in projection 36 is adapted to be fittingly inserted in the plug-in reception means 24 provided in the outer chain link 3, while the detent hooks 37 are inserted into the detent openings 25 and are locked in position on the underside thereof.

The inner chain link 2 fully consists of a reinforced plastic material and can be produced in a very simple manner by suitable moulding processes, in particular by injection moulding.

When the chain 1 moves straight ahead, the inner and outer link plates 26.1, 26.2; 13.1, 13.2, which are arranged such that they are set up on edge, are oriented at right angles to the first axis $A_1$, i.e. all the link plates are oriented vertically when the chain moves horizontally straight ahead.

Making reference to FIG. 13 to 15, a second embodiment of a side bow conveyor chain 1 according to the present invention will now be explained.

Only essential differences will be discussed; for identical components and components producing the same effect, reference will therefore be made to the description of the above first embodiment making use of the same reference numerals.

One difference is to be seen in the fact that the pivot pin 7 has a greater length and projects beyond the lower edges of the inner chain links 2 and of the outer chain links 3. This allows the chain to be guided in a side bow by an e.g. horizontally running sprocket (not shown) whose teeth engage the gaps between the projecting ends of the pivot pins 7.

Another difference is to be seen in the way in which the support plates are mounted, only the support plate 4.1 for the inner chain link 2 being shown in FIG. 15. The inner chain link 2 shown in FIGS. 13 and 14 again includes a raised cover plate 28, which is, in this case, provided with a detent groove 38. The detent groove 38 is undercut and does not extend across the whole width of the inner chain link 2.

The support plate 4.1 has, on the lower surface thereof, a detent means 39 which is adapted to the detent groove 38 and which can be inserted said detent groove 38 from the side as a locking piece. Detent hooks 40 come into locking engagement with the end portions of the detent groove 38 and secure the support plate 4.1 against further lateral displacement.

In this embodiment, the outer chain link 3 is also provided with a correspondingly implemented cover plate 22 with a detent groove that is not shown in detail. The support plate 4.2 can be implemented identically with the support plate 4.1 shown in FIG. 15, and it can be inserted in the detent groove of the cover plate 22 of the outer chain link 3 and locked in position therein.

Making reference to FIG. 16 to 19, a third embodiment of a side bow conveyor chain 1 according to the present invention will be explained in more detail in the following.

Only essential differences existing in comparison with the first embodiment will be discussed in detail. For identical components and components producing the same effect, reference will be made to the description of the first embodiment making use of identical reference numerals.

An essential difference is to be seen in the fact that the reception sleeve 8 of the inner chain link 2 is rounded to a lesser extent so that the distance between the reception sleeve 8 and the straight cross webs 20 must be larger. The cross webs 20 define an X in this embodiment (cf. in particular FIG. 17). Also in the case of this embodiment, the pivot pin 7 projects downwards beyond the chain links so that it can come into engagement with a horizontally extending sprocket (not shown). On the upper side, both chain links 2 and 3 are provided with an undercut guide groove 41 and 42. The support plates 4.1 and 4.2 can be inserted into this guide groove from the side, said support plates 4.1 and 4.2 being provided with a locking piece 43 which projects downwards and which is adapted to the cross-section of the guide grooves 41 and 42; such a locking piece 43 is shown exemplarily for the support plate 41 in FIG. 18.

The centering projection 17 has the shape of a bead in this embodiment and, consequently, it is more prominent here. In the front area, the funnel faces 19, which border on the centering projection 17, are provided once more.

In the case of the inner chain link 2, the outer surfaces of the inner link plates 26.1 and 26.2 approach, in principle tangentially, the outer circumferential surface of the reception sleeve 8. The transition region of said inner link plates 26.1 and 26.2 has, however, formed therein a longitudinal groove 44 which extends from the top to the bottom and the cross-section of which essentially corresponds to the cross-section of the bead-shaped centering projection 17.

On the basis of FIG. 17, it can be seen how the bead-shaped centering projection 17 is received in the longitudinal groove 44 in the case of a side bow, whereby, in co-operation with the funnel faces 19, a larger pivotability about the axis $A_2$ is obtained. Also in the case of this embodiment, the outer chain link 3 and the inner chain link 2 as well as the pivot pin 7 are made of a plastic material, whereas the pivot bolt 6 is made of a steel material.

FIG. 20 shows an alternative embodiment of a support plate contour. The front and rear teeth 32.1 and 32.2 are point symmetric with respect to one another so that the support plate can be installed in any direction and so that the plate belt has, consequently, no preferential direction.

The use of inner chain links 2 and outer chain links 3, in combination with the use of the chain hinge 5 which is pivotable about two axes $A_1$ and $A_2$, leads to a more stable structural design, since closed shapes are used as far as possible. Also the fact that the respective inner and outer link plates are arranged in parallel and set up on edge contributes to this closed shape.

The invention claimed is:

1. A side bow conveyor chain (1) whose respective inner chain links (2) and outer chain links (3) are interconnected by a chain hinge (5) which is pivotable about a first and a second axis ($A_1$, $A_2$), said chain hinge (5) comprising a pivot bolt (6) which is arranged along said first axis ($A_1$), a pivot pin (7) which is arranged along said second axis ($A_2$), the pivot bolt (6) extending through a hole (10) in the pivot pin (7), the chain hinge (5) further comprising a reception sleeve (8), which extends along the second axis ($A_2$) and in which the pivot pin (7) is pivotable relative to the reception sleeve (8) about said second axis ($A_2$), said reception sleeve (8) being provided with lateral pivot openings (11) which allow the pivot bolt (6) to pass through, characterized in that inner and outer chain links (2, 3) are provided in alternating succession, that an inner chain link (2) comprises a reception sleeve (8) on either end thereof and at least one inner link plate (26.1, 26.2) interconnecting said reception sleeves (8), that an outer chain link (3) comprises a pivot bolt (6) and a pivot pin (7) on either end thereof and at least two outer link plates (13.1, 13.2) interconnecting the same, that the end faces of the at least two outer link plates (13.1, 13.2) laterally encompass a reception sleeve (8) of a neighbouring inner chain link (2), wherein the outer surfaces of the outer link plates (13.1, 13.2) are perpendicular to the first axis ($A_1$) and the outer surfaces of the at least one inner link plate (26.1, 26.2) are parallel to the second axis ($A_2$).

2. The side bow conveyor chain (1) according to claim 1, characterized in that at least the inner link plates (26.1, 26.2) and the outer link plates (13.1, 13.2) of the inner and outer chain links (2, 3) are produced from a plastic material.

3. The side bow conveyor chain (1) according to claim 1, characterized in that the at least one inner link plate (26.1, 26.2) and the two reception sleeves (8) of an inner chain link (2) are produced from a plastic material in the form of an integral component.

4. The side bow conveyor chain (1) according to claim 1 characterized in that the pivot pins (7) project beyond a lower end face of the reception sleeves (8).

5. The side bow conveyor chain (1) according to claim 1, characterized in that the reception sleeves (8) are implemented such that they are closed at the upper end thereof and have thus a cup-shaped structural design.

6. The side bow conveyor chain (1) according to claim 1, characterized in that the outer link plates (13.1, 13.2) have on the inner side thereof a centering projection (17) encompassing the pivot bolt (6) at least in certain areas thereof, and that the distance ($A_z$) between two opposed centering projections corresponds essentially to the width ($B_A$) of the sleeve (8) arranged therebetween.

7. The side bow conveyor chain (1) according to claim 6, characterized in that a longitudinal center line ($M_z$) of the centering projection (17) extends in a plane which is oriented essentially at right angles to a longitudinal center line ($M_A$) of the outer chain link (3) and through which the first axis ($A_1$) extends, the centering projection (17) extending over at least 50% of the height of the inner link plate (26.1, 26.2).

8. The side bow conveyor chain (1) according to claim 6, characterized in that an outer surface of the at least one inner link plate (26.1, 26.2) of an inner chain link (2) is oriented essentially tangentially to the outer circumferential surface of the reception sleeve (8), the transition region having formed therein a longitudinal groove (44) which extends essentially at right angles to the first axis ($A_1$) and a longitudinal axis ($M_i$) of the inner chain link (2) and which has a cross-section that is adapted to the cross-section of the centering projection (17).

9. The side bow conveyor chain (1) according to claim 6, characterized in that the distance ($A_i$) between an outer surface of the at least one inner link plate (26.1, 26.2) of an inner chain link (2) and the longitudinal center line ($M_i$) of the inner chain link (2) is smaller than half the width ($B_A$) of the reception sleeve (8).

10. The side bow conveyor chain (1) according to claim 1, characterized in that the distance between the inner surfaces of the at least two outer link plates (13.1, 13.2) increases continuously between the pivot bolt (6) and the end face of the outer link plates (13.1, 13.2).

11. The side bow conveyor chain (1) according to claim 10, characterized in that the two inner surface sections (19) at the end faces of the at least two outer link plates (13.1, 13.2) open relative to one another in an angular range ($\alpha$) of from 15° to 45°.

12. The side bow conveyor chain (1) according to claim 1, characterized in that at least two outer link plates (13.1, 13.2) of the outer chain link (3) are interconnected by means of at least one cross web (20) extending between the reception sleeves (8) of neighbouring inner chain links (2).

13. The side bow conveyor chain (1) according to claim 12, characterized in that a plurality of cross webs (20) is provided, said cross webs (20) encompassing the end faces of the neighbouring inner chain links (2) at least partially, thus defining reception bays (21) for the reception sleeves (8).

14. The side bow conveyor chain (1) according to claim 1, characterized in that the outer sides of the outer link plates (13.1, 13.2) have provided thereon sleevelike projections (16) for accommodating the pivot bolt ends.

15. The side bow conveyor chain (1) according to claim 1, characterized in that the end portions of the outer link plates (13.1, 13.2) are reinforced at least in the area of the pivot bolts (6).

16. The side bow conveyor chain (1) according to according to claim 1, characterized in that in a plane extending at right angles to the longitudinal center line ($M_i$) of the inner chain link (2) and along the second axis ($A_2$), the reception sleeves (8) have a wall thickness ($W_1$) which exceeds the wall thickness in a plane rotated by 90° about the second axis ($A_2$).

17. The side bow conveyor chain (1) according to claim 1, characterized in that a plate belt (4) consisting of individual support plates (4.1, 4.2) is provided, and that the support plates (4.1, 4.2) are connected to at least one of the outer and inner chain links (2, 3).

18. The side bow conveyor chain (1) according to claim 17, characterized in that the support plates (4.1, 4.2) are connected to at least one of the outer and inner chain links (2, 3) by means of detent units (25, 34; 31, 37; 38, 39).

19. The side bow conveyor chain (1) according to claim 18, characterized in that at least one of the inner chain links (2) and the outer chain links (3) are provided with plug-in reception means (24, 30), a plug-in projection (33, 36) of a respective associated support plate (4.1, 4.2) being in positive engagement with said plug-in reception means (24, 30) and being secured in position by means of the additional detent units.

20. The side bow conveyor chain (1) according to claim 17, characterized in that the support plates (4.1, 4.2) are in toothed engagement with one another and that the contour of a support plate (4.1, 4.2) is essentially point symmetric.

21. The side bow conveyor chain (1) according to claim 1, characterized in that at least the inner link plates (26.1, 26.2) and the outer link plates (13.1, 13.2) of the inner and outer chain links (2, 3) are produced from a high-strength plastic material.

* * * * *